Nov. 17, 1936.  H. N. WADE  2,061,012
HOSE VALVE AND COUPLING FOR VOLATILE LIQUIDS
Filed June 12, 1934
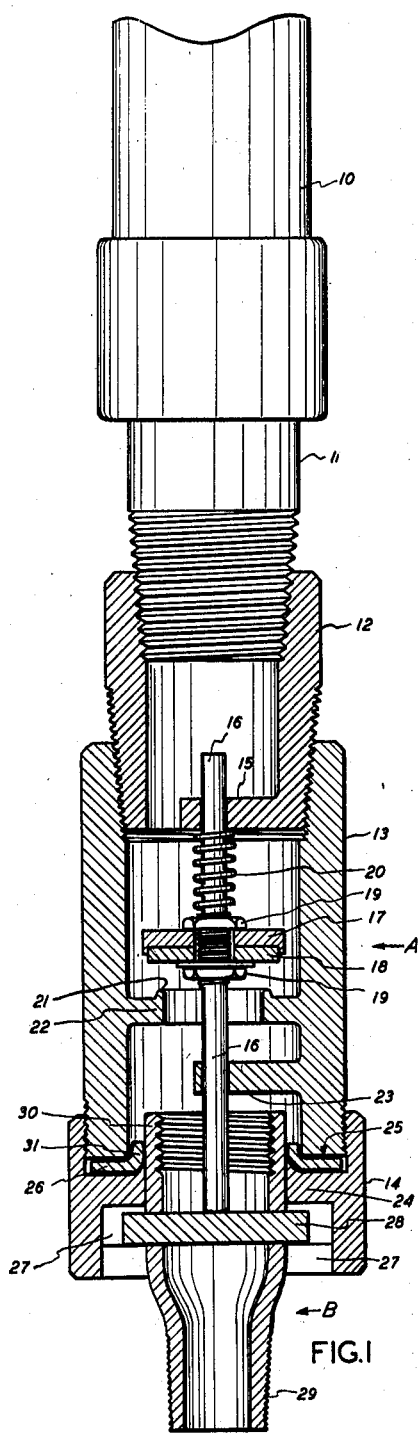
FIG.1
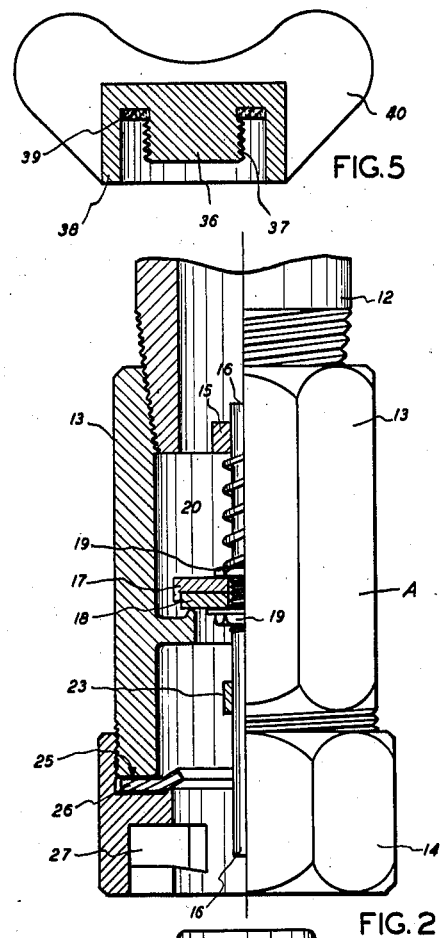
FIG.5
FIG.2
FIG.3
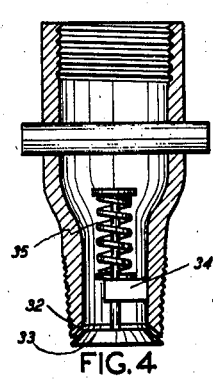
FIG.4
HENRY N. WADE
INVENTOR
ATTORNEY Patented Nov. 17, 1936

2,061,012

UNITED STATES PATENT OFFICE 2,061,012

HOSE VALVE AND COUPLING FOR VOLATILE LIQUIDS

Henry N. Wade, Los Angeles, Calif., assignor to Parkhill-Wade, Incorporated, Los Angeles, Calif., a corporation of California Application June 12, 1934, Serial No. 730,250

1 Claim. (Cl. 284—19)

The object of my invention is to provide a fitting having couping means and automatic valve means for attachment to the end of a hose used for filling tanks with butane and other liquids boiling substantially below normal atmospheric temperature.

In the very recent past commercial butane has become an important fuel for heavy automobiles and trucks. Commercial butane contains some propane and boils under one atmosphere absolute pressure at or below zero Fahrenheit and must therefore be retained and handled at superatmospheric pressure to prevent loss.

In dispensing butane to the tanks of automotive vehicles it is practically necessary to use a flexible hose, because of the time required to make up pipe connections, and for this purpose a special butane hose is now available. The use of this hose has, however, been rendered awkward by the lack of a suitable free-end fitting. At the end of a filling operation the hose is full of butane. If a plug cock or other type of valve, together with a union fitting, be placed on the free end of the hose, the assembly is very heavy and clumsy, while if the valve be placed at the fixed end, whatever butane remains in the hose is discharged when the hose is uncoupled from the tank, volatilizing rapidly and reducing the temperature of the hose lining to zero Fahrenheit or below, at which temperature the hose is rendered brittle and subject to damage if bent.

To overcome these difficulties I have devised the fitting herein described, which weighs little more than a coupling of equal size and acts automatically to retain all the butane in the hose when the latter is withdrawn from the vehicle tank. This fitting is shown in the attached drawing, in which Fig. 1 is a vertical section through the assembled device, as in the act of filling, with the automatic valve open;

Fig. 2 is an elevation of the coupling member A of Fig. 1 with parts broken away to show the valve in closed position;

Fig. 3 is an elevation of the tank nozzle B of Fig. 1;

Fig. 4 is a vertical section through a modified form of tank nozzle including a check valve, and Fig. 5 is a section through a cap used to seal the tank nozzle after filling the tank.

Referring to the drawing, the device consists of a coupling member A which is permanently attached to the hose and a tank nozzle B which is permanently attached to the tank to be filled.

The coupling member, for convenience in renewing flexible packings, is made in three separable parts; a guide plug 12, a valve body 13, and a lock ring 14. These three parts form a unitary fitting which is separated only for the purpose of repacking.

The end of a flexible hose 10 is provided with a metallic male-end fitting 11 which is firmly screwed into the guide plug 12, which in turn is tightly screwed into the upper end of the body 13. A spider or lug 15 supports the upper end of the valve stem 16 which is provided with a metallic disc 17 and a flexible packing disc 18 retained by nuts 19—19 in the usual manner. A spring 20 tends to urge the valve discs downward and into engagement with a seat 21 formed on the upper face of an internal rib 22. The lower end of the valve stem is supported by a spider or lug 23 carried by the body 13. On backing out the guide plug the valve assembly 16—17—18—19—20 may be lifted out of the upper end of the body 13.

The lock ring 14 is firmly screwed onto the lower end of the body, first placing between the internal rib 24 and the faced end 25 a ring 26 which may be of "Duprene" or any sufficiently flexible oil resistant material. The lower end of the lock ring is provided with T or L slots 27 which, in cooperation with pin 28 of tank nozzle B form a bayonet catch.

The nozzle B is provided at its lower end with threads 29 which may be firmly screwed into a correspondingly threaded opening in the tank to be filled, it being the intention that each tank be provided with its own nozzle permanently retained. The upper end 30 of the nozzle is sized to pass readily through the opening within the rib 24 but the opening through the flexible ring 26 should be of slightly less diameter so that when the nozzle is passed through it, it will be turned upwardly as indicated at 31 and thus form a tight seal around the smooth outer face of the nozzle. It will be evident that the tightness of this joint will be increased by internal pressure within the lower portion of the body.

To connect the hose to the tank to be filled, the coupling member A is placed over the nozzle in such manner that the nozzle end passes through the flexible ring 26 and the slots 27 pass over the ends of pin 28, after which a slight turn given to the body locks it in place. The length of the lower end of valve stem 16 is so adjusted to the position of pin 28 that the end of the stem engages the pin after the nozzle end 30 has entered the opening through ring 27 and so that the forcing of the bayonet catch into its locking position will lift the valve disc 18 clear of seat 21, as shown in Fig. 1. A leak-tight joint is thus formed between 30 and 26 before the valve opens to permit butane to flow from the hose into the space below the valve.

The form of nozzle shown in Fig. 1 must be used in conjunction with a valve between the nozzle and the tank, but in the form shown in Fig. 4 no valve is required and the nozzle may be screwed directly into the tank. In this form a seat 32 is formed in or near the lower or inward end of the nozzle and a valve 33 carried in a guide 34 and upwardly urged by a light spring 35 prevents loss of butane on withdrawal of the coupling.

To protect the upper end of the nozzle from damage and also to form a tight seal for the contents of the tank, it is desirable to provide the removable cap shown in Fig. 5. This cap is provided with a plug 36 threaded as at 37 to screw inside the upper end of the nozzle, with a skirt 38 adapted to closely fit the exterior of the nozzle end, with a ring 39 of flexible packing, and with wings 40 or other extensions for screwing into place by hand.

I claim as my invention:

A hose-end coupling and valve comprising: a hollow body having a valve seat formed therein; a valve longitudinally movable in said body and adapted to engage said seat; a metallic ring having slots formed therein and arranged to screw onto said body and a flexible ring retained between said metallic ring and the end of said body; a tank nozzle having a projecting end formed to pass through and deform said flexible ring; a pin passing through and laterally projecting from said nozzle and cooperating with said slots to lock said body to said nozzle; a stem attached to said valve and arranged to engage said pin and lift said valve from its seat when said body is locked to said nozzle.

HENRY N. WADE.